(12) United States Patent  
Sundarababu et al.

(10) Patent No.: US 10,764,241 B2  
(45) Date of Patent: Sep. 1, 2020

(54) ADDRESS ASSIGNMENT AND DATA FORWARDING IN COMPUTER NETWORKS

(71) Applicant: Dell Products L.P., Round Rock, TX (US)

(72) Inventors: Premnath Sundarababu, Chennai (IN); Karthick Selvaraj, Coimbatore (IN)

(73) Assignee: Dell Products L.P., Round Rock, TX (US)

( * ) Notice: Subject to any disclaimer, the term of this patent is extended or adjusted under 35 U.S.C. 154(b) by 130 days.

(21) Appl. No.: 15/909,795

(22) Filed: Mar. 1, 2018

(65) Prior Publication Data

US 2019/0273716 A1  Sep. 5, 2019

(51) Int. Cl.
*H04L 29/12* (2006.01)
*H04L 12/713* (2013.01)

(52) U.S. Cl.
CPC ........ *H04L 61/2046* (2013.01); *H04L 45/586* (2013.01); *H04L 61/103* (2013.01); *H04L 61/2015* (2013.01); *H04L 61/6022* (2013.01)

(58) Field of Classification Search
CPC . H04L 61/2046; H04L 61/103; H04L 45/586; H04L 61/2015; H04L 61/6022
See application file for complete search history.

(56) References Cited

U.S. PATENT DOCUMENTS

| | | | |
|---|---|---|---|
| 9,692,695 B2 | 6/2017 | Lin et al. | |
| 2007/0081535 A1* | 4/2007 | Li | H04L 12/433 370/392 |
| 2009/0141685 A1* | 6/2009 | Berglund | H04W 36/0055 370/331 |
| 2013/0262701 A1* | 10/2013 | Nieminen | H04L 61/2503 709/245 |
| 2015/0222521 A1* | 8/2015 | Bonen | H04L 45/02 370/254 |
| 2015/0280994 A1* | 10/2015 | Kim | H04L 63/062 709/223 |
| 2016/0080196 A1 | 3/2016 | Janardhanan et al. | |

FOREIGN PATENT DOCUMENTS

WO  WO-2009/007830  1/2009

OTHER PUBLICATIONS

Cheshire, S., "IPv4 Address Conflict Detection", RFC 5227, DOI 10.17487/RFC5227, Jul. 2008, <https://www.rfc-editor.org/info/rfc5227>.

Droms, R., "Dynamic Host Configuration Protocol", RFC 2131, DOI 10.17487/RFC2131, Mar. 1997, <https://www.rfc-editor.org/info/rfc2131>.

(Continued)

*Primary Examiner* — Michael A Keller

(74) *Attorney, Agent, or Firm* — Haynes and Boone, LLP

(57) ABSTRACT

When a network host (110H.1) requests an IP address (via DHCP for example), and a candidate IP address is generated, the candidate IP address and the host's MAC address are installed in the ARP table(s) of at least one router present in the host's LAN. If installation is unsuccessful, e.g. due to the ARP table being full or due to a hash collision, the candidate IP address is declined, and another IP address is generated. Other features are also provided.

18 Claims, 4 Drawing Sheets

(56) References Cited

OTHER PUBLICATIONS

Nadas, S., Ed., "Virtual Router Redundancy Protocol (VRRP) Version 3 for IPv4 and IPv6", RFC 5798, DOI 10.17487/RFC5798, Mar. 2010, <https://www.rfc-editor.org/info/rfc5798>.

Plummer, D., "Ethernet Address Resolution Protocol: Or Converting Network Protocol Addresses to 48.bit Ethernet Address for Transmission on Ethernet Hardware", STD 37, RFC 826, DOI 10.17487/RFC0826, Nov. 1982, < https://www.rfc-editor.org/info/rfc826>.

\* cited by examiner

ADDRESS ASSIGNMENT AND DATA FORWARDING IN COMPUTER NETWORKS

BACKGROUND

The present disclosure relates generally to information handling systems (IHSs), and more particularly to computer networks and network nodes such as routers, switches, and end stations.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An IHS may include a router that forwards data packets between other nodes or hosts (in this disclosure, "host" and "node" are synonymous, to indicate any node of a computer network). A packet may include an IP (Internet Protocol) destination address, and the router maps the IP address to a Media Access Control (MAC) address of the next hop in the packet's path. The next hop may be the destination node or another router.

It is desirable to improve address handling in computer networks.

SUMMARY

This section summarizes some features of some embodiments of the invention. Other features are described below. The invention is defined by the appended claims.

Some embodiments of the present invention provide improved address handling, such as IP address assignment to a network node. For example, an IP address can be assigned to a node based on address mapping resources of at least one router that would need to map the node's IP address to the MAC address to forward a packet to the node. To assign an IP address to the node, a candidate IP address is generated, and a check is made whether the router would be able to map the candidate IP address to the node's MAC address in an effective way, e.g. using the router's mapping database. For example, a check can be made whether the router can install the candidate IP address and the node's MAC address in the router's mapping database. If installation is impossible for the router or a set of routers, the candidate IP address is declined, and another candidate IP address is generated.

A mapping database can be an ARP (Address Resolution Protocol) table, e.g. a "hardware" ARP table, such as stored in the router's data plane. (A data plane is a router's portion that has limited, non-flexible functionality but is optimized for fast packet forwarding.)

In some embodiments, the router has different databases for mapping IP addresses to MAC addresses. Some of the databases (e.g. hardware ARP tables) can be searched fast in the mapping operation. Other databases can be larger but slower, and are used when the fast databases do not have the mapping information for an IP address. Examples of such databases include "software" ARP tables, such as stored in the control plane. (A control plane has more flexible functionality, and possibly more memory for the ARP tables, but is slower in packet forwarding.) In such embodiments, when a candidate IP address is generated, a check is made whether a router can install the candidate IP address in one or more fast databases. If installation is impossible, the candidate IP address is declined, and another candidate IP address is generated.

These features are exemplary and not limiting. The invention is not limited to IP or ARP, nor to other features described above, except as defined by the appended claims.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
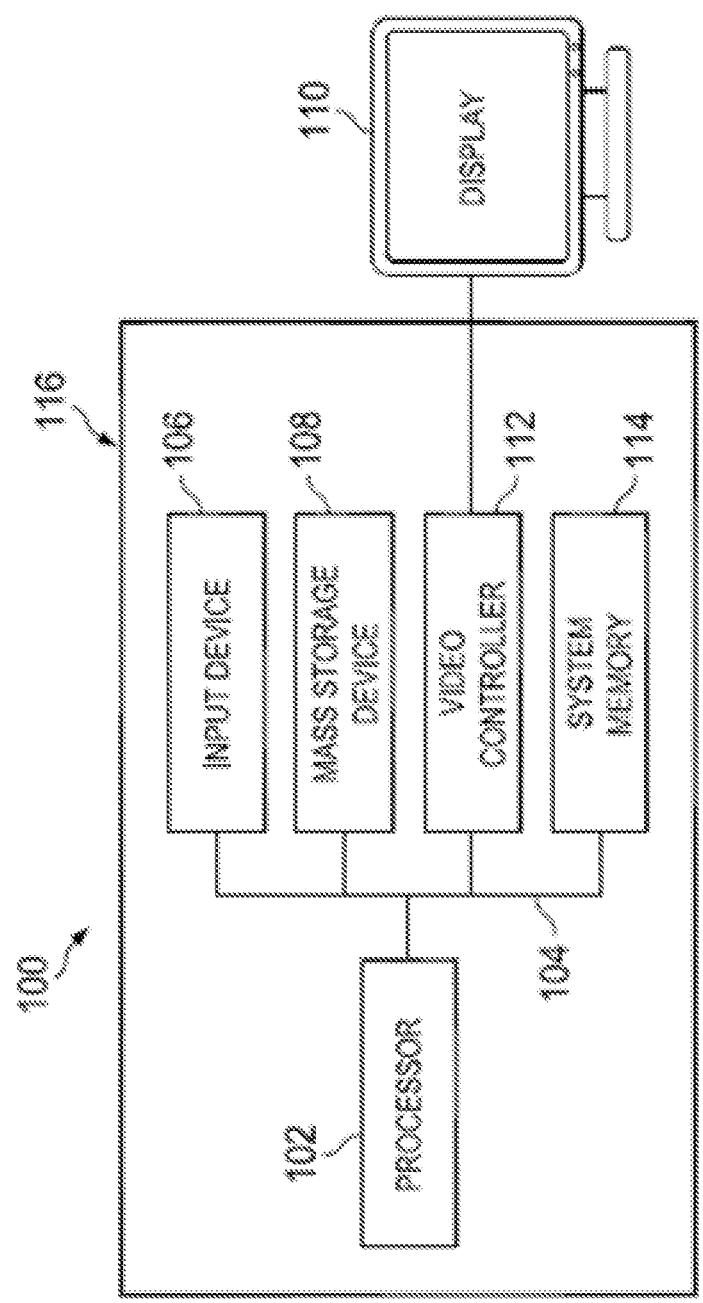
FIG. 1 is a block diagram of an information handling system used in routers and other nodes in some embodiments of the present invention.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
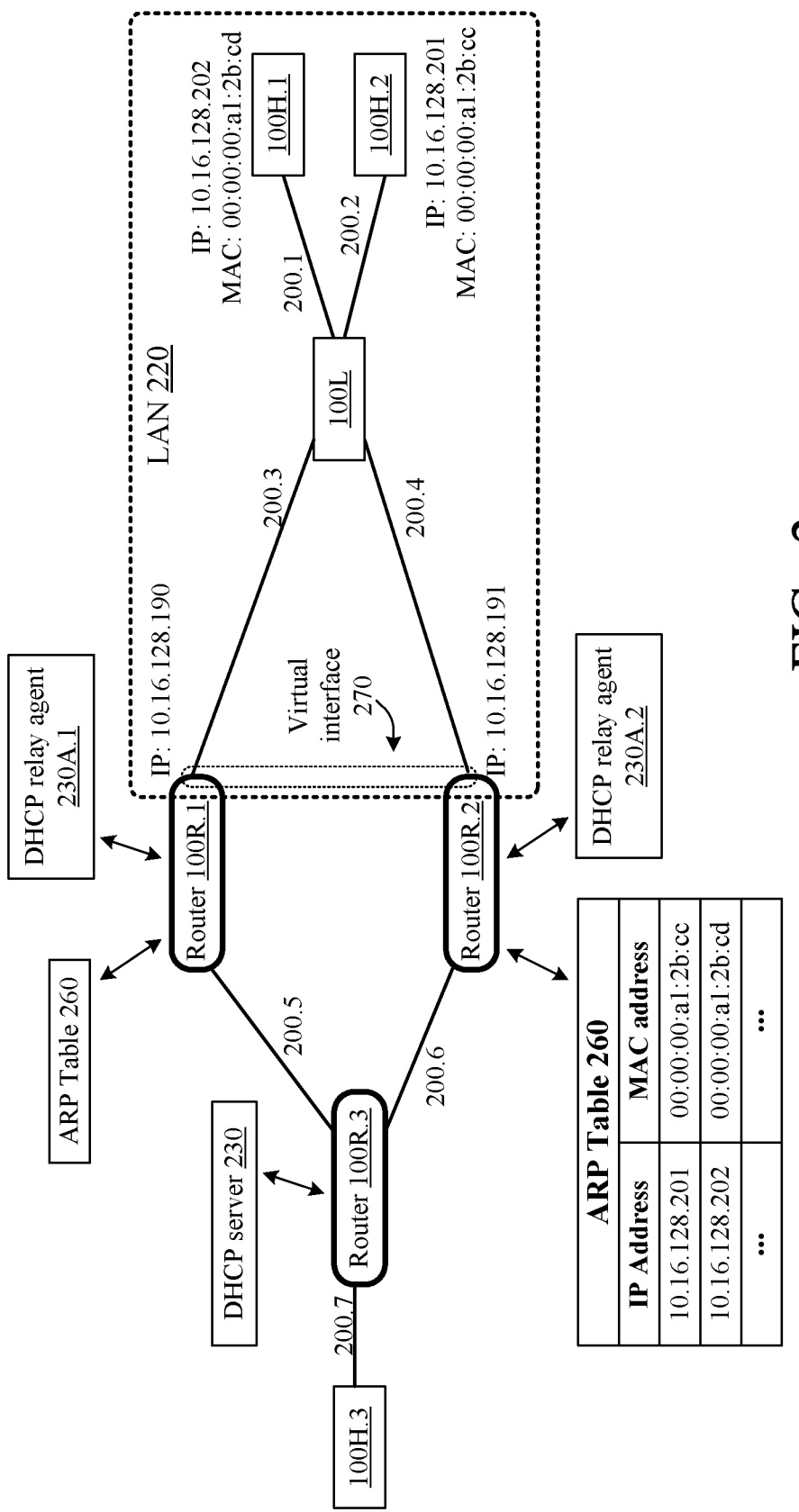
FIG. 2 is a diagram of a network used to illustrate some embodiments of the present invention.

FIG. 2 shows an exemplary computer network with network nodes 100 such as routers 100R.1, 100R.2, . . . ; layer-2 switch 100L; and other hosts 100H.1, 100H.2, . . . which may or may not serve as switches and/or routers. Each node 100 may include an IHS as in FIG. 1, or may include at least some components as in FIG. 1. For example display 110 may or may not be present. Nodes 100 exchange network data via network links 200 (200.1, 200.2, etc.). Each link 200 may be any suitable link including, for example, wire links, fiber optics cables, wireless links, or some other kind, or combinations of the same or different types of links.

Each node 100 is connected to a link 200 at the node's interface. An interface can be a physical port, but can be a logical structure: a physical port may provide multiple interfaces, and vice versa different ports may be combined into a single interface. An interface can be part of a Medium Access Controller device (MAC), e.g. a modem. Also, the same physical structure may provide interfaces at different network layers, e.g. layer 2 and layer 3.

An interface may have a MAC (Medium Access Controller) address, which may be a physical address burned into the MAC device, or can be a logical addresses. MAC addresses (e.g. Ethernet addresses) are sometimes called layer-2 addresses.

Within a local area network (LAN), such as shown at 220 in FIG. 2, nodes 100 can communicate by specifying their MAC addresses as source and destination addresses. But in a large network such as the Internet, distant nodes 100 do not always know each other' MAC addresses, and distant nodes may communicate via their network addresses, e.g. IP addresses. Network addresses are typically logical addresses.

Layer-2 switches (such as 100L) forward data between other nodes based on MAC addresses. Routers 100R (such as 100R.1, 100R.2, 100R.3) forward packets based on network addresses. Within each LAN, the router translates the packet's IP destination address to a MAC address and forwards the packet based on the MAC address.

To communicate outside the LAN, a host within the LAN requests to be assigned an IP address for the host's interface. The IP address is possibly assigned by a server such as DHCP server 230 running on router 100R.3 or some other node 100 and assigning IP addresses to hosts 100 on LAN 220. "DHCP" stands for Dynamic Host Configuration Protocol. See Droms, R., "Dynamic Host Configuration Protocol", RFC 2131, DOI 10.17487/RFC2131, March 1997, <https://www.rfc-editor.org/info/rfc2131>. incorporated herein by reference. See also international patent application publication no. WO 2009/007830 A2 (applicant: TELEFONACTIEBOLAGET L M ERICSSON (PUBL)), published 15 Jan. 2009, incorporated herein by reference.

In some embodiments, DHCP server 230 is implemented by software stored in memory 114 (FIG. 1) or mass storage device 108 on router 100R.3 and executed by the router's CPU 102. But other types of servers and server implementations are possible, including non-software implementations.

In the example of FIG. 2, DHCP server 230 is outside of LAN 220. Therefore, when host 100H.1 or 100H.2 does not yet have an IP address, the host communicates with the DHCP server via a DHCP relay agent 230A.1 running on router 100R.1, and/or DHCP relay agent 230A.2 running on router 100R.2, since routers 100R.1 and 100R.2 are in LAN 220. (DHCP relay agents are also called "BOOTP relay agents" in RFC 2131.)

When a host, such as 100H.1, requests an IP address from DHCP server 230, the DHCP server may assign not only the IP address to the host but may also assign a router—100R.1 or 100R.2—through which the host should preferably communicate with other hosts (e.g. with host 100H.3) outside of LAN 220. The DHCP server may assign both routers 100R.1 and 100R.2 to be used in some order of preference. The routers are specified to host 100H.1 by their IP interface addresses on LAN 220. These addresses are sent to the host as a router option in a DHCP ACK message.

Suppose a host, such as 100H.1, needs to send a data packet to another node 100 ("destination"). Regardless of whether the destination is or is not on LAN 220, the host 100H.1 may have the destination's IP address but not the MAC address. (If the destination is not on LAN 220, the destination MAC address can be the address of router 100R.1 or 100R.2.) Host 100H.1 uses Address Resolution Protocol (ARP) to determine the destination's MAC address. ARP is described in Plummer, D., "Ethernet Address Resolution Protocol: Or Converting Network Protocol Addresses to 48.bit Ethernet Address for Transmission on Ethernet Hardware", STD 37, RFC 826, DOI 10.17487/RFC0826, November 1982, https://www.rfc-editor.org/info/rfc826, incorporated herein by reference.

In particular, host 100H.1 broadcasts an ARP REQUEST packet on LAN 220, with the destination's IP address. If a LAN 220 node (e.g. 100H.2 or 100L or 100R.1 or 100R.2) recognizes the IP address as its own, the node will respond to host 100H.1 with the node's MAC address.

Moreover, routers 100R and other nodes may cache the IP-to-MAC address mapping of other nodes. The cache is called an ARP table, such as tables 260 in FIG. 2. In the example shown, ARP table 260 on router 100R.2 maps the IP address 10.16.128.201 of host 100H.2 to the host's MAC address 00:00:00:a1:2b:cc; and maps the IP address 10.16.128.202 of host 100H.1 to the corresponding MAC address 00:00:00:a1:2b:cd.

A router 100R may respond to the ARP REQUEST from host 100H.1 if the router finds the requested IP address in the router's ARP table 260.

Routers 100R.1 and 100R.2 may use ARP to forward packets coming from outside of LAN 220, e.g. from host 100H.3 to host 100H.1. Such a packet includes the destination IP address of host 100H.1, and the destination MAC address of the router. The router uses its ARP table 260 to determine the destination MAC address of host 100H.1, and if the MAC address is not in the ARP table, then the router may use an ARP REQUEST broadcast to get the MAC address from host 100H.1.

Routers 100R.1 and 100R.2 may be configured to operate as a single virtual router (VR) on LAN 220, e.g. according to Virtual Router Redundancy Protocol (VRRP) described in Nadas, S., Ed., "Virtual Router Redundancy Protocol (VRRP) Version 3 for IPv4 and IPv6", RFC 5798, DOI 10.17487/RFC5798, March 2010, https://www.rfc-editor.org/info/rfc5798, incorporated herein by reference.

In VRRP, two or more routers form a virtual router (VR). The routers may form a VRRP group; one of the routers is a master, and the other router(s) are backup members. All the network traffic in the group is handled by the master. The backup members operate only when the master goes down—in this case, one of the backup members becomes the master.

This scheme wastes backup members' bandwidth. To avoid this waste, multiple groups can be defined in the same virtual router; each router is the master in one of the groups, and is a backup member in every other group.

In particular, in routers 100R.1 and 100R.2, the IP interfaces connected to LAN 220 (to links 200.3 and 200.4) can be treated as a single, virtual IP interface 270, with its own (virtual) IP address. When a master router in the group goes down, and another router becomes master, the virtual IP address does not change. However, different groups have different IP addresses for virtual interface 270. In the example shown, the routers 100R.1 and 100R.2 can form two VRRP groups. In one group, router 100R.1 is the master, and the VRRP interface 270 has the virtual address of 10.16.128.190. Even if router 100R.1 fails and router 100R.2 becomes the master, the router 100R.2 will still use this virtual address for traffic on virtual interface 270.

In the other group, router 100R.2 is the master. The VRRP interface 270 has the virtual address of 10.16.128.191.

The aforementioned international patent application WO 2009/007830 describes load balancing in VRRP as follows. When a LAN host (such as 100H) needs to communicate with a VRRP router on the same LAN as the host, the host uses ARP to discover the corresponding virtual MAC address for the VRRP router group. Different VRRP groups have different MAC addresses. In response to the host's request, the ARP protocol selects the virtual MAC address (and hence the VRRP group) based on a load balancing algorithm, e.g. round-robin or weighted round-robin.

Some embodiments of the present invention provide a different type of load balancing, based on the availability of ARP tables 260 (or some other tables) at the time of the IP address assignment, e.g. as part of DHCP. The invention is not limited to DHCP or VRRP or any other address-assignment or virtual-router scheme however.

Figure 3:
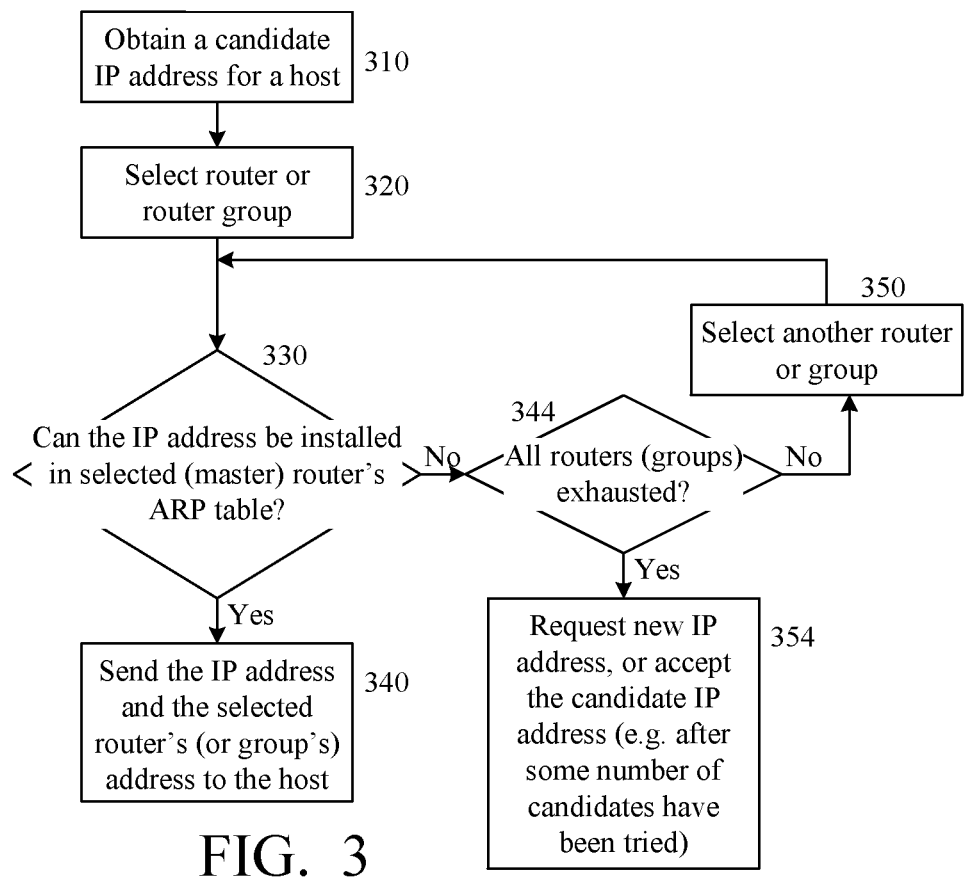
FIG. 3 is a flowchart of operations performed by a network entity according to some embodiments of the present invention.

FIG. 3 shows an exemplary flowchart for an IP address assignment operation, which can be performed by DHCP server 230, or a DHCP relay agent 230A, or some other entity, which can run on any node. In the example discussed below, the operation is performed by DHCP relay agent 230A.1. It is assumed that host 100H.1 requested an IP address, and is communicating with DHCP server 230 through DHCP relay agent 230A.1. This example is not limiting however.

At step 310, DHCP relay agent 230A.1 obtains a candidate IP address generated by DHCP server 230 for the host. For example, the IP address can be part of a DHCP ACK message sent by DHCP server 230 to host 100H.1 via DHCP relay agent 230A.1. The DHCP ACK message also has the host's MAC address.

At step 320, DHCP relay agent 230A.1 selects one of routers 100R.1 and 100R.2 (more than two routers may be available), or selects a VRRP router group (and hence the group's master), for the router option in DHCP ACK. The router option may have been set by the DHCP server 230, but it can be modified by DHCP relay agent 230A.1.

In some embodiments, if the router option was set by DHCP server 230, the DHCP relay agent 230A.1 does not change (i.e. neither adds nor deletes) the routers in the router option, but if the router option has multiple routers then DHCP relay agent 230A.1 may change their order of preference as described below. In some embodiments of step 320, if the router option was set by DHCP server 230, the DHCP relay agent 230A.1 selects the most preferred router in the router option.

Suppose for example that the DHCP relay agent 230A.1 selects the router 100R.1 (or the corresponding VRRP group 1) at step 320.

At step 330, DHCP relay agent 230A.1 determines whether or not the candidate IP address and the host's MAC address can be installed in ARP table 260 of the selected router 100R.1. For example, the DHCP relay agent 230A.1 may try to install the IP and MAC addresses in ARP table 260 of router 100R.1.

In some embodiments, the router includes both hardware and software ARP tables, and only the hardware ARP tables are used in the operation of FIG. 3.

Router 100R.1 may have multiple ARP tables for different ports, e.g. on different line cards, or different stackable-switch components of a stacked switch. At step 330, the DHCP relay agent 230A.1 may try to install the IP and MAC addresses in each ARP table or any subset of the ARP tables, possibly in just one ARP table.

If the answer is "Yes" at step 330, e.g. the installation is successful, then, at step 340, DHCP relay agent 230A.1 sends the candidate IP address to the host 100H.1, together with the selected router's (or group's) IP address to be used by the host if the host needs to reach the router. The host's and selected router's addresses can be sent as part of the DHCP ACK message; the router or VRRP group can be identified by its IP interface address in router option (option 3) in the DHCP ACK message. The router option may include both routers 100R.1 and 100R.2 or both groups, but router 100R.1 or group 1 will be shown as the most preferred. If the router 100R.1 or group 1 is already the most preferred, then the DHCP ACK message is unchanged, i.e. is the same as generated by DHCP server 230.

The ARP installation step 330 may fail because, for example, the ARP table is full (or at least one ARP table is full if step 330 is performed on multiple ARP tables). In some embodiments, the ARP table may or may not be full but may be unavailable for other reasons. For example, in some embodiments, in packet forwarding, the ARP table entry for the packet's destination IP address is determined by hashing the IP address (and possibly other parameters, e.g. the VLAN ID). Therefore, at step 330, the candidate IP address can only be installed in ARP entries associated with the corresponding hash value. If there is a hash collision, the installation may fail even if the ARP table has unused entries.

If step 330 fails, DHCP relay agent 230A.1 determines at step 344 if there is another router or group to try, and selects another router or group (e.g. router 100R.2) at step 350 if not all routers or groups have been exhausted. In some embodiments, the DHCP relay agent 230A.1 only checks the routers (or groups) in the router option, and selects the routers in the order of preference as set in the router option by DHCP server 230.

If not all the routers or groups have been exhausted, a new router or group is selected, and the flow returns to step 330. For example, if router 100R.2 is selected at step 350, and router 100R.2 can install the candidate IP address, then step 340 is performed as described above. Otherwise, the flow goes to step 344 as described above.

If step 344 determines that all the available routers/groups (e.g. those in the router option) have been tried, an appropriate action is taken at step 354. For example, step 354 can be identical to step 340, i.e. the IP address can be sent to the host. The router's address provided to the host can be any router's or group's address, e.g. the last selected router's or group's address. The selected router or group may be unable to use its ARP tables 260 for packet forwarding to the host, and may have to use some other database or ARP messaging (e.g. ARP DISCOVERY broadcast) to determine the host's MAC address for packet forwarding.

Another option for step 354 is to decline the candidate IP address. DHCP relay agent 230A.1 may transmit a DHCP DECLINE message, or some other message, to DHCP server 230, to cause the DHCP server to generate another candidate IP address. Or DHCP agent 230A.1 may send the IP address to the host, and wait for the host to issue a gratuitous ARP REQUEST. In conventional environments, a host may issue a gratuitous ARP request to verify that the host's IP address is not used by another node: the gratuitous ARP request requests to resolve the host's own IP address to a MAC address, and if the host receives a response with some other MAC address, then the host knows that the IP address is used by another node. The host then sends a DHCP DECLINE to DHCP server 230. In some embodiments of the present invention, at step 354, DHCP relay agent 230A.1 sends the IP address to the host in a DHCP ACK message, but then intercepts and responds to the host's gratuitous ARP request with some MAC address to cause the host to issue a DHCP DECLINE. These options are exemplary and not limiting.

In some embodiments, when the candidate IP address is declined, and DHCP server 230 issues other candidate IP addresses which also fail to install in the routers' ARP tables 260, then the candidate IP addresses are declined up to some maximum number of times (e.g. three times). The last candidate IP address is accepted at step 354 regardless of whether it can be installed in any router's ARP table. (If the last address can be installed in a router's ARP table, the router is given the highest priority in the DHCP ACK router option.)

Routers 100R can have any suitable architecture. In some embodiments, a router can be as in FIG. 1. In other embodiments (FIG. 4), a router has a data plane 410 and a control plane 420. The data plane is optimized for fast packet forwarding. It may include a processor and memory (such as processor 102 and memory 114 or storage 108 in FIG. 1). The memory may store the ARP table 260 and other tables needed to route an incoming packet. For example, the ARP table can be stored in a content addressable memory (CAM) 434, addressable by the packet header fields including, for example, part or all of the destination IP address. For each destination IP address, the CAM provides the corresponding MAC address and other information as needed, e.g. the port on which the packet should be transmitted.

Figure 4:
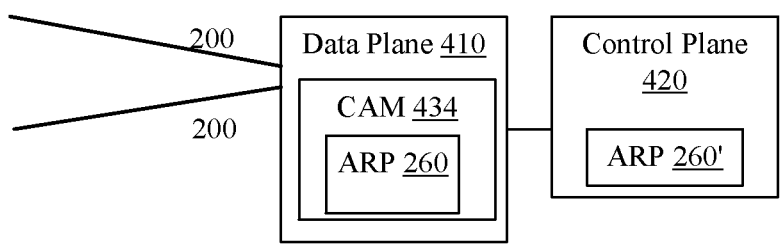
FIG. 4 is a block diagram of a router according to some embodiments of the present invention.

In FIG. 4, if ARP 260 does not resolve the destination IP address, the data plane 410 sends a message to control plane 420, which has its own processor and memory for processing the incoming packet. For example, control plane 420 may execute ARP (broadcast ARP request on LAN 220) to determine the destination MAC address, and/or perform other processing as needed. Or control plane 420 may have another ARP database 260' from which the MAC address can be determined. Database 260' may be larger because, for example, it may have more memory available. Searching the database 260' may or may not be slower than searching the database 260. Database 260' may be part of a random access memory or some other type of storage.

While FIG. 4 shows the data plane and the control plane as separate blocks, their components can be intermixed, as in a stacking system of stackable switches described in U.S. Pat. No. 9,692,695, issued 27 Jun. 2017 to Lin et al., incorporated herein by reference. Another suitable switch architecture is disclosed in US patent application published as no. 2016/0080196 on 17 Mar. 2016 (inventors: Janardhanan et al.), incorporated herein by reference. Other architectures are possible.

Figure 5:
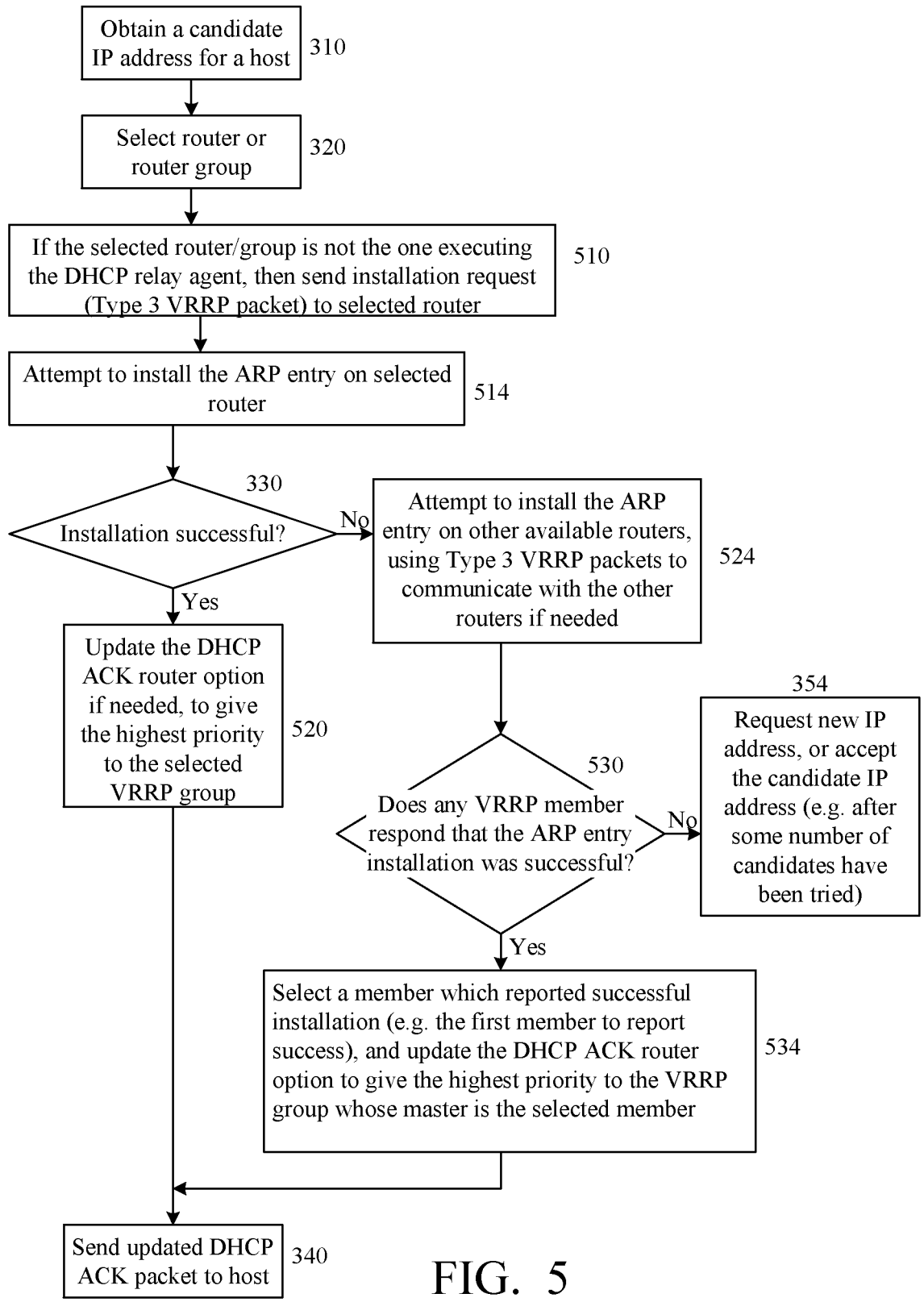
FIG. 5 is a flowchart of operations performed by network entities according to some embodiments of the present invention.

FIG. 5 shows a variation of the method of FIG. 3. This method may be executed by the system of FIG. 1 or 4 or some other network entity. At step 310 of FIG. 5, the DHCP relay agent (or some other entity, possibly running on control plane 420) gets the DHCP ACK packet from the DHCP server. The DHCP ACK packet includes the host's candidate IP address, MAC address, and possibly a router option having a list (one or more) of VRRP groups in the order of preference.

At step 320, the DHCP relay agent selects a router or group, possibly as in FIG. 3. For example, the highest priority router or group in the router option can be selected.

To install the candidate IP address on the selected router, the DHCP relay agent may have to send the candidate IP address and the host's MAC address to the selected router over a network (step 510) unless the DHCP relay agent is running on the selected router. For example, if the DHCP relay agent is 230A.1, and the selected router is 100R.2, then the candidate IP and MAC addresses are sent to router 100R.2. In some embodiments, this communication ("installation request") is formatted as a VRRP packet (similar to VRRP advertisement), distinguished by the Type field (e.g. Type=3).

At step 514, the selected router attempts to install the ARP entry with the candidate IP and MAC addresses.

If the installation is successful (step 330), then, at step 520, the DHCP relay agent would update the DHCP ACK router option to give the highest priority to the selected router or group. However, this update is not needed at this iteration because the selected router or group is already the one with the highest priority per step 320.

The DHCP ACK packet is then sent to the host (step 340).

If the installation is unsuccessful at step 330, then (step 524) installation is attempted at other available routers. In some embodiments, the available routers are only the VRRP member routers, and/or only the routers specified in the DHCP ACK router option. If no router is available, step 524 is skipped, and the flow goes directly to step 354.

At step 524, the DHCP relay agent sends installation requests (e.g. VRRP Type 3 packets) to all the other available routers except the router running the DHCP relay agent.

If at least one available router performs successful installation of the candidate IP address (step 530), the DHCP relay agent selects one such router (step 534), for example the highest priority successful router in the DHCP router option. The DHCP relay agent modifies the DHCP ACK router option to give this router or the corresponding VRRP group the highest priority. Then the modified DHCP ACK message is sent to the host at step 340 as described above.

If no router reported success, then (step 354) the process continues as in FIG. 3 at step 354.

Other embodiments are possible. For example, some embodiments include only one router (e.g. 100R.1) in LAN 220. A candidate IP address is declined if the router cannot install the IP address in ARP table 260. VRRP is optional; the processes of FIGS. 3 and 5 are not limited to virtual router configurations.

Some embodiments modify the aforementioned load-balancing system described in WO 2009/007830 A2 by selecting (or giving preference) to the virtual MAC address corresponding to the VRRP group whose master router can install the requesting NODE'S IP AND MAC ADDRESSES IN THE ROUTER'S ARP TABLE.

In the embodiments discussed above, the successful ARP table installation can be combined with other criteria. For example, in IP address assignment as described above (e.g. in FIGS. 3 and 5), steps 330 may check other parameters in addition to the successful ARP table installation. For example, the number of empty ARP entries can be taken into account. Also, the number of the empty entries corresponding to the candidate IP address hash value can be taken into account. In some embodiments, steps 330 are performed on multiple routers for a given candidate IP address, and the preferred router may be the router with the greatest number of empty ARP table entries. Other criteria can also be used.

Some embodiments of the invention are defined by the following clauses:

Clause 1. A method performed by a computer entity (e.g. DHCP relay 230A.1 or some other entity), for assigning a first protocol address (the first protocol may be IP or some other protocol) to a first network node (e.g. 100H.1), the method comprising the computer entity performing operations of:

(a) obtaining a first candidate address for the network node, the first candidate address conforming to the first protocol;

(b) determining, for at least one network forwarding system (NFS; for example, a router 100R.1 or 100R.2) among one or more NFSs each of which is operable as an intermediate system in communicating between the first network node (e.g. 100H.1) and one or more other network nodes (e.g. 100H.3), whether the NFS is operable to install, in its first database (e.g. ARP table(s) 260), a mapping of the first candidate address to at least one second address conforming to a second protocol (e.g. a layer 2 protocol, e.g. Ethernet);

(c) assigning or not assigning the first candidate address to the first network node based at least in part on said determining whether at least one NFS is operable to install, in its first database, said mapping from the first candidate address to the second address.

2. The method of clause 1 wherein each second protocol address comprises a physical address.

3. The method of any preceding clause wherein the second address is an address of the first network node.

4. The method of any preceding clause wherein none of the NFSs is operable to install said mapping from the first candidate address to the second address, and the method further comprises declining the first candidate address.

5. The method of clause 4 further comprising, upon declining the first candidate address, obtaining another candidate address conforming to the first protocol.

6. The method of clause 4 or 5 further comprising performing operations (b) and (c) on the other candidate address.

7. The method of any preceding clause wherein each first protocol address comprises a network address.

8. The method of any preceding clause wherein in operating as an intermediate system, each NFS is operable to forward one or more data packets by performing operations comprising:

receiving a data packet comprising a first protocol destination address;

mapping the first protocol destination address to a second protocol destination address; and forwarding the packet based on the second protocol destination address;

wherein said mapping of the first protocol destination address to the second protocol destination address comprises:

searching the NFS's first database for a mapping of the first protocol destination address to an associated second protocol address;

if said searching is successful, then using the associated second protocol address as the second protocol destination address;

if said searching is unsuccessful, then transmitting the first protocol destination address in a network communication (e.g. ARP request) to determine the second protocol destination address.

9. The method of clause 8 wherein the network communication conforms to Address Resolution Protocol.

10. The method of any one of clauses 1 to 7 wherein in operating as an intermediate system, each NFS is operable to forward one or more data packets by performing operations comprising:

receiving a data packet comprising a first protocol destination address;

mapping the first protocol destination address to a second protocol destination address; and forwarding the packet based on the second protocol destination address;

wherein said mapping of the first protocol destination address to the second protocol destination address comprises:

searching the NFS's first database for a mapping of the first protocol destination address to an associated second protocol address;

if said searching is successful, then using the associated second protocol address as the second protocol destination address;

if said searching is unsuccessful, then searching the NFS's second database (e.g. ARP table 260') for a mapping of the first protocol destination address to an associated second protocol address, wherein at least one of the following is true:

the second database is larger than the first database;

searching the second database is slower than searching the first database;

the first database is part of the NFS's data plane, but the second database is not;

the second database is searched using a processor not used to search the first database;

the first database is stored in a content addressable memory, but the second database is not.

11. The method of any preceding clause wherein obtaining the first candidate address comprises obtaining the first candidate address from a message conforming to Dynamic Host Configuration Protocol (DHCP).

12. The method of clause 11 wherein the message is DHCP ACK.

13. The method of clause 11 or 12 wherein the computer entity is a DHCP server or a DHCP relay agent.

14. The method of any preceding clause wherein the computer entity is part of a network node which also comprises one of the one or more NFSs.

15. The method of any preceding clause wherein the one or more NFSs comprise a plurality of the NFSs that are configured as a virtual NFS for forwarding packets to and from the first network node.

16. The method of clause 15 wherein the virtual NFS comprises a virtual interface for communicating with any network node of a set of nodes (e.g. LAN 220 nodes) comprising the first network node, the virtual interface being assigned a virtual address conforming to the first protocol.

17. The method of any preceding clause wherein each NFS is a router, and the routers are configured to operate as a virtual router.

18. The method of any preceding clause wherein each NFS is a group of member routers, each group comprising the same members, each group being configured to have a unique virtual interface address for communicating with the first network node.

19. The method of clause 18 wherein each group is a Virtual Router Redundancy Protocol (VRRP) group.

20. A method performed by a computer entity (e.g. DHCP relay agent 230A) for selecting at least one of a plurality network forwarding systems (NFS) for use by a first network node as an intermediate system in communicating with other network nodes, wherein in each NFS, for at least some of the packets forwarded by the NFS, the forwarding comprises mapping each packet's first protocol destination address to one or more associated second protocol destination addresses, wherein the method comprises the computer entity performing operations of:

obtaining a first address which is a first protocol address for the first network node;

determining, for each NFS of one or more of the NFSs, whether the NFS is operable to install, in its first database, a mapping from the first address to a second address which is a second protocol address;

selecting or not selecting at least one NFS based at least in part on said determining whether the NFS is operable to install, in its first database, said mapping from the first address to the second address.

21. The method of clause 20 wherein each second protocol address comprises a physical address.

22. The method of clause 20 or 21 wherein the second address is a second protocol address of the first network node.

23. The method of any one of clauses 20 to 22 wherein said determining is performed for the NFSs in sequence, and said selecting comprises selecting, in said sequence, the first NFS operable to install, in its first database, said mapping from the first address to the second address.

24. The method of any one of clauses 20 to 22 wherein none of the NFSs is operable to install said mapping from the first address to the second address, and the method further comprises declining the first address as the first protocol address for the first network node, to have a different first protocol address assigned to the network node instead of the first address.

25. The method of any one of clauses 20 to 24 wherein each first protocol address comprises a network address.

26. The method of any one of clauses 20 to 25 wherein said mapping of each packet's first protocol destination address to one or more associated second protocol destination addresses by an NFS comprises:

searching the NFS's first database for a mapping of the packet's first protocol destination address to one or more associated second protocol addresses;

if said searching is successful, then outputting at least one associated second protocol address obtained from the NFS's first database in said searching as at least one associated second protocol destination address;

if said searching is unsuccessful, then performing network communication to determine at least one associated second protocol destination address.

27. The method of clause 26 wherein the network communication conforms to Address Resolution Protocol.

28. The method of any one of clauses 20 to 27 wherein obtaining the first address comprises obtaining the first address from a message sent to the first network node in response to the first network node's request for a first protocol address to be assigned to the first network node.

29. The method of clause 28 wherein:

said selecting or not selecting comprises selecting an NFS; and the method further comprises identifying the selected NFS as selected to the first network node.

30. The method of clause 28 or 29 wherein the message conforms to Dynamic Host Configuration Protocol (DHCP).

31. The method of clause 30 wherein the message is DHCP ACK.

32. The method of clause 30 or 31 wherein the computer entity is a DHCP server or a DHCP relay agent.

33. The method of any one of clauses 20 to 32 wherein the computer entity is part of a network node which also comprises one of the NFSs.

34. The method of any one of clauses 20 to 33 wherein the first network node is one of a set of one or more network nodes, and the NFSs are configured as a virtual NFS for forwarding packets to and from the set.

35. The method of clause 34 wherein the virtual NFS comprises a virtual interface for communicating with any node of the set, the virtual interface being assigned a virtual address conforming to the first protocol.

36. The method of any one of clauses 20 to 35 wherein each NFS is a router, and the routers are configured to operate as a virtual router.

37. The method of any one of clauses 20 to 36 wherein each NFS is a group of member routers, each group comprising the same members, each group being associated with a unique virtual interface address for communicating with the first network node.

38. The method of clause 37 wherein each group is a Virtual Router Redundancy Protocol (VRRP) group.

The invention also includes network nodes (e.g. routers, hosts, switches) that perform methods described above. The invention includes computer readable media (e.g. disks, magnetic tapes, semiconductor memories, and possibly others) that contain software instructions which, when executed by a computer processor or processors, cause the methods to be performed.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

The invention claimed is:

1. A method performed by a computer entity, for assigning a first protocol address to a first network node, the method comprising the computer entity performing operations of:
   (a) obtaining a first candidate address for the network node, the first candidate address conforming to the first protocol;
   (b) determining, for at least one network forwarding system (NFS) among one or more NFSs each of which is operable as an intermediate system in communicating between the first network node and one or more other network nodes, whether the NFS is operable to install, in its first database, a mapping of the first candidate address to at least one second address conforming to a second protocol;
   (c) assigning or not assigning the first candidate address to the first network node based at least in part on said determining whether at least one NFS is operable to install, in its first database, said mapping from the first candidate address to the second address;
   wherein in operating as an intermediate system, each NFS is operable to forward one or more data packets by performing operations comprising:
   receiving a data packet comprising a first protocol destination address;
   mapping the first protocol destination address to a second protocol destination address; and
   forwarding the packet based on the second protocol destination address;
   wherein said mapping of the first protocol destination address to the second protocol destination address comprises:
   searching the NFS's first database for a mapping of the first protocol destination address to an associated second protocol address;
   if said searching is successful, then using the associated second protocol address as the second protocol destination address;
   if said searching is unsuccessful, then transmitting the first protocol destination address in a network communication to determine the second protocol destination address.

2. The method of claim 1 wherein each second protocol address comprises a physical address.

3. The method of claim 1 wherein the second address is an address of the first network node.

4. The method of claim 1 wherein none of the NFSs is operable to install said mapping from the first candidate address to the second address, and the method further comprises declining the first candidate address.

5. The method of claim 4 further comprising, upon declining the first candidate address, obtaining another candidate address conforming to the first protocol.

6. The method of claim 5 further comprising performing operations (b) and (c) on the other candidate address.

7. The method of claim 1 wherein each first protocol address comprises a network address.

8. The method of claim 1 wherein the network communication conforms to Address Resolution Protocol.

9. The method of claim 1 wherein obtaining the first candidate address comprises obtaining the first candidate address from a message conforming to Dynamic Host Configuration Protocol (DHCP).

10. The method of claim 9 wherein the message is DHCP ACK.

11. The method of claim 9 wherein the computer entity is a DHCP server or a DHCP relay agent.

12. The method of claim 1 wherein the computer entity is part of a network node which also comprises one of the one or more NFSs.

13. The method of claim 1 wherein the one or more NFSs comprise a plurality of the NFSs that are configured as a virtual NFS for forwarding packets to and from the first network node.

14. The method of claim 13 wherein the virtual NFS comprises a virtual interface for communicating with any network node of a set of nodes comprising the first network node, the virtual interface being assigned a virtual address conforming to the first protocol.

15. The method of claim 1 wherein each NFS is a group of member routers, each group comprising the same members, each group being configured to have a unique virtual interface address for communicating with the first network node.

16. The method of claim 15 wherein each group is a Virtual Router Redundancy Protocol (VRRP) group.

17. A non-transitory computer readable memory comprising computer instructions for execution by a computer system comprising one or more computer processors to cause the computer system to perform a method for assigning a first protocol address to a first network node, the method comprising the computer system performing operations of:
   (a) obtaining a first candidate address for the network node, the first candidate address conforming to the first protocol;
   (b) determining, for at least one network forwarding system (NFS) among one or more NFSs each of which is operable as an intermediate system in communicating between the first network node and one or more other network nodes, whether the NFS is operable to install, in its first database, a mapping of the first candidate address to a second address conforming to a second protocol;
   (c) assigning or not assigning the first candidate address to the first network node based at least in part on said determining whether at least one NFS is operable to install, in its first database, said mapping from the first candidate address to the second address;
   wherein in operating as an intermediate system, each NFS is operable to forward one or more data packets by performing operations comprising:
   receiving a data packet comprising a first protocol destination address;
   mapping the first protocol destination address to a second protocol destination address; and
   forwarding the packet based on the second protocol destination address;
   wherein said mapping of the first protocol destination address to the second protocol destination address comprises:
   searching the NFS's first database for a mapping of the first protocol destination address to an associated second protocol address;
   if said searching is successful, then using the associated second protocol address as the second protocol destination address;
   if said searching is unsuccessful, then transmitting the first protocol destination address in a network communication to determine the second protocol destination address.

18. A computer system comprising the non-transitory computer readable memory of claim 17 and the one or more computer processors.

\* \* \* \* \*